United States Patent
Stobbe et al.

(10) Patent No.: US 8,973,838 B2
(45) Date of Patent: Mar. 10, 2015

(54) SMALL DETECTION PLATE

(75) Inventors: Anatoli Stobbe, Barsinghausen (DE);
Norman Maas, Hannover (DE)

(73) Assignee: EYES OPEN Corporation, Carson City, NV (US)

( * ) Notice: Subject to any disclaimer, the term of this patent is extended or adjusted under 35 U.S.C. 154(b) by 0 days.

(21) Appl. No.: 13/806,113

(22) PCT Filed: Jun. 25, 2010

(86) PCT No.: PCT/DE2010/000734
§ 371 (c)(1),
(2), (4) Date: Dec. 20, 2012

(87) PCT Pub. No.: WO2011/160606
PCT Pub. Date: Dec. 29, 2011

(65) Prior Publication Data
US 2013/0092743 A1    Apr. 18, 2013

(51) Int. Cl.
| | |
|---|---|
| G06K 19/06 | (2006.01) |
| G06K 19/077 | (2006.01) |
| H01Q 1/22 | (2006.01) |
| H01Q 5/00 | (2006.01) |
| H01Q 7/00 | (2006.01) |
| H01Q 9/26 | (2006.01) |
| H01Q 9/28 | (2006.01) |

(52) U.S. Cl.
CPC ........ *G06K 19/07779* (2013.01); *H01Q 1/2225* (2013.01); *H01Q 5/0034* (2013.01); *H01Q 7/005* (2013.01); *H01Q 9/26* (2013.01); *H01Q 9/285* (2013.01)
USPC ........................................................ 235/492

(58) Field of Classification Search
CPC .................... G06K 19/07749; G06K 19/0775; G06K 19/07779
USPC ........................................................ 235/492
See application file for complete search history.

(56) References Cited

U.S. PATENT DOCUMENTS

| | | |
|---|---|---|
| 2004/0074975 A1 | 4/2004 | Gundlach et al. |
| 2005/0093677 A1 | 5/2005 | Forster et al. |
| 2007/0052613 A1 | 3/2007 | Gallschuetz et al. |
| 2008/0074272 A1 | 3/2008 | Stobbe et al. |

FOREIGN PATENT DOCUMENTS

| | | |
|---|---|---|
| FR | 2869707 A1 | 4/2005 |
| WO | 2009146678 A1 | 10/2009 |

*Primary Examiner* — Jamara Franklin
(74) *Attorney, Agent, or Firm* — Jeffrey L. Thompson; Thompson & Thompson, P.A.

(57) ABSTRACT

A small detection plate has a chip module and an antenna module. A chip of the chip module is coupled to an antenna conductor of the antenna module via a coupling loop. The antenna conductor is an antenna loop and comprises a wire arranged in at least one winding. The antenna loop is mechanically connected to the second carrier by textile embroidering technology or by wire laying technology. Adjacent windings and the ends of the wire are insulated from one another.

11 Claims, 1 Drawing Sheet

SMALL DETECTION PLATE

BACKGROUND OF THE INVENTION

1. Field of the Invention

The present invention relates generally to a detection plate having a chip module arranged in or on an antenna module, and more specifically to such a detection plate in which a coupling loop of the chip module is inductively coupled to an antenna conductor of the antenna module.

2. Description of the Related Art

A data carrier having an electronic chip which can be read, and optionally written, remotely by a reader is termed a detection chip. It obtains the energy required for its chip from the reader without contact. Both the transmission of data and the transmission of energy take place by means of an electromagnetic field.

Where detection plates are used for the identification of persons, they can be the size of a credit card. For the detection of objects, smaller sizes may be necessary.

In the case of detection plates operating at a frequency in the LF or HF range, it is not possible to realize antennas adjusted mechanically to half-wave. It is only possible to achieve antenna resonance by the use of concentrated components. For this reason, the antenna is most commonly designed as an antenna coil of an oscillating circuit. In the case of detection plates operating at a frequency in the UHF and SHF ranges, however, it is possible to realize dipole antennas with half-wave dimensions, or at least dipole antennas which are mechanically shortened but electrically lengthened.

In any case, dipole antennas are sensitive to neighboring objects. Objects with dielectric conductance can lead to a detuning of the antenna resonance frequency. Electrically conductive objects, particularly metal objects, can absorb energy, act as shields, or likewise lead to a detuning of the antenna resonance frequency.

SUMMARY OF THE INVENTION

An object of the present invention is to provide a detection plate wherein the readable distance thereof is less strongly influenced by dielectrically conductive or electrically conductive objects compared to that of detection plates having an antenna designed as an extended dipole.

This object of the invention is solved by providing a detection plate having a chip module comprising a first support with a chip and an inductive coupling loop connected to the chip, and having an antenna module comprising a second support and an antenna conductor. The chip module is arranged in or on the antenna module, and the coupling loop is inductively coupled to the antenna conductor. The detection plate is characterized in that the antenna conductor is an antenna loop and comprises a wire which is arranged in at least one winding, and which is mechanically connected to the second support by textile embroidery or by wire embedding technology, wherein adjacent windings and ends of the wire are insulated with respect to each other Further developments and advantageous embodiments of the invention are also described herein.

In the case where the antenna conductor has a loop shape, the magnetic component of the electromagnetic field is more strongly concentrated than if the antenna conductor has an extended shape. This effect is particularly pronounced in the case of a completely closed loop. Because detection plates serve the purpose of identifying persons, animals, or objects, the antenna conductor of the detection plate is situated near tissues or materials with a dielectricity which is different from the free field dielectricity. These tissues or materials lead to an absorption of the electric component of the electromagnetic field, as well as detuning of the resonance frequency. In contrast, the magnetic component would only be absorbed by ferromagnetic materials, such that no weakening of the magnetic component of the electromagnetic field occurs when such materials are absent. As long as only the electric component of the electromagnetic field is compromised, the magnetic component of the electromagnetic field still enables a sufficient readable distance. This is particularly the case when detection plates are worn on the body or are exposed to moisture when used for the identification of articles which are washed.

The solution according to the invention functions without contact to the antenna conductor. For this reason, it is largely resistant to chemical damage, and very resistant to mechanical stresses.

The combination of a chip with an inductive coupling element on a first support is referred to herein as a chip module. An integrated circuit which has the following components is referred to herein as a chip: a data transmitter, data receiver, energy receiver, controller with a control program, and a non-volatile memory for storing data. The combination of an antenna conductor in or on a second support is referred to herein as an antenna module. In the event that the antenna conductor is attached on the second support by textile embroidery technology, the second support is preferably a flat textile structure. In the event that the antenna conductor is attached on the second support by means of wire embedding technology, the second support is preferably a film or a plastic card.

In one advantageous embodiment, the antenna loop has the structure of a rectangle. On one of the sides of the rectangle, end regions of the wire are arranged parallel to each other beyond the circumference of a complete winding.

The ends which run parallel to each other form a capacitance which leads to a flatter voltage maximum compared to ends which are opposite each other, and which therefore leads to a balanced distribution of current and increase in the magnetic component of the electromagnetic field. In addition, the resonance width of the oscillating circuit formed by the antenna loop is enlarged.

The geometric circumference of the antenna loop can be the same as or a multiple of the half-wavelength of a reader device which reads the detection plate remotely.

In the event that the antenna is detuned, the probability also increases that resonance with the operating frequency of a reader device reading remotely will be achieved. In this case, the electric component of the electromagnetic field also reaches a maximum, thereby contributing to a greater readability distance.

The antenna loop may have multiple windings, and can constitute an antenna coil of an oscillating circuit tuned to the HF or LF range, together with the terminals of a HF or LF detection plate, the terminals being galvanically connected to the ends of the wire. Also, the parallel windings of the wire can constitute a single-winding antenna for the UHF range.

In this case, the same antenna loop forms a combination antenna for two different operating frequencies.

BRIEF DESCRIPTION OF THE DRAWINGS

The invention will be explained below by means of an exemplary embodiment, which is illustrated in the drawings. In the drawings.

DETAILED DESCRIPTION OF THE INVENTION

Figure 1:
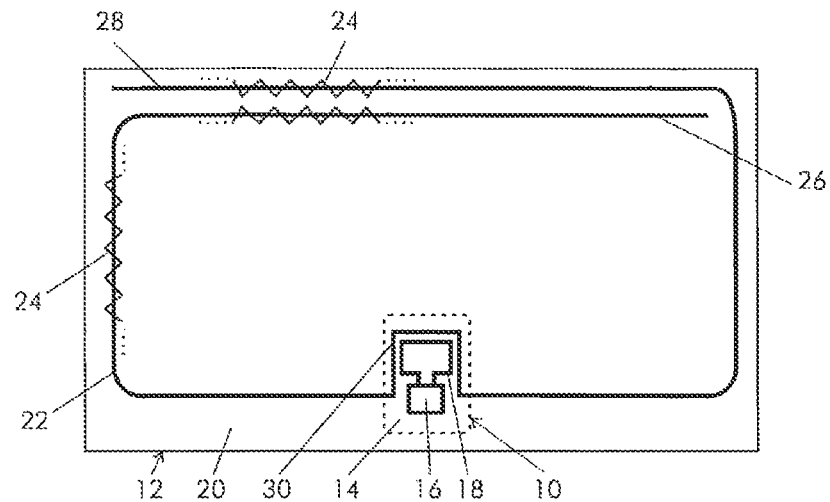
FIG. 1 shows a detection plate with an antenna conductor attached by means of embroidery technology.

The detection plate illustrated in FIG. 1 has a chip module 10 and an antenna module 12. The chip module 10 comprises a first support 14 with a chip 16, and a coupling loop 18 connected to the chip 16. The antenna module 12 comprises a second support 20 with an antenna conductor 22. The support 20 is a flat textile structure. The antenna conductor 22 is an insulated wire which is mechanically fastened on the support 20 by means of embroidery technology using embroidery yarn 24.

The antenna conductor 22 is structured in the manner of a loop with a rectangular shape. End regions 26, 28 of the antenna conductor 22 are attached on one side of the rectangle, overlapping and parallel to each other with a minimal separation distance. A loop path 30 is constructed on the side lying opposite the side containing the end regions 26, 28, and provides a tight coupling of the antenna loop and the coupling loop 18 of the chip module 10. The chip module 10 with its first support 14 is positioned and attached on the second support 20 in such a manner that the coupling loop 18 is enclosed by the loop path 30.

Figure 2:
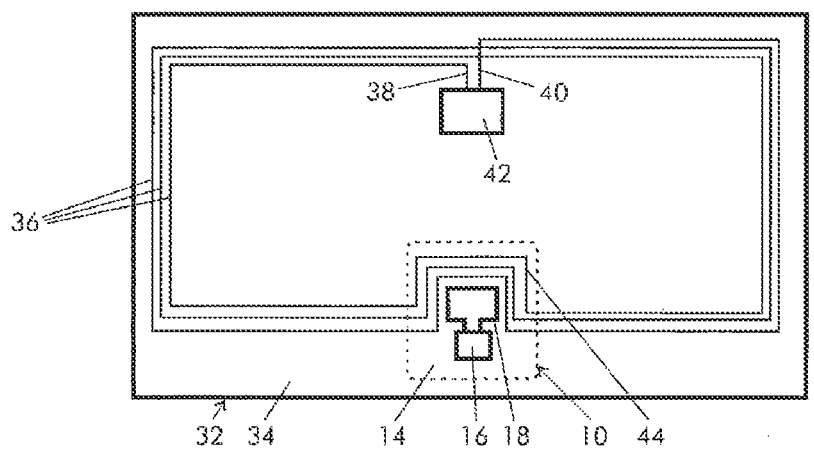
FIG. 2 shows a detection plate with an antenna conductor which functions as a combination antenna and which is attached by means of wire embedding technology.

The detection plate illustrated in FIG. 2 differs from the one shown in FIG. 1 by the design of the antenna module 32. The antenna module 32 comprises a second support 34 made of a plastic card on which the antenna conductor 36 is arranged and attached by wire embedding technology. The antenna conductor 36 has multiple windings, the ends 38, 40 of which lead to a chip 42 for the HF range and are welded to terminals of the chip 42.

The windings of the loop formed by the antenna conductor 36 likewise have a rectangular structure. Regions of the windings run in a loop path 44 on the side which lies opposite the chip 42. As in FIG. 1, the chip module 10, with its first support 14, is positioned and attached on the second support 34 in such a manner that the coupling loop 18 is enclosed by the loop path 44. The multiple windings of the antenna conductor 36 behave like a single-winding antenna for the chip module 10 in the UHF range as in the illustration of FIG. 1, due to the capacitive termination.

The invention claimed is:

1. A detection plate, having a chip module comprising a first support with a chip and an inductive coupling loop connected to the chip, and having an antenna module comprising a second support and an antenna conductor, wherein the chip module is arranged in or on the antenna module, and the coupling loop is inductively coupled to the antenna conductor;
   wherein the antenna conductor is an antenna loop and comprises a wire which is arranged in at least one winding, said wire comprising a loop path inductively coupled to said coupling loop of said chip module, and said wire being mechanically connected to the second support by textile embroidery or by wire embedding technology, wherein adjacent windings and ends of the wire are insulated with respect to each other.

2. The detection plate according to claim 1, wherein the antenna loop is arranged in a shape of a rectangle, and end regions of the wire on one side of the rectangle are arranged parallel to each other beyond a circumference of a complete winding.

3. The detection plate according to claim 1, wherein a geometric circumference of the antenna loop is the same or a multiple of a half-wave of an operating wavelength of a reader device which remotely reads the detection plate.

4. The detection plate according claim 1, wherein the antenna loop comprises multiple windings, and the antenna loop provides an antenna coil of an oscillating circuit tuned to the HF or LF range, and terminals of an HF or LF detection plate are galvanically connected to the ends of the wire.

5. The detection plate according to claim 4, wherein said wire comprises parallel windings that provide a single-winding antenna for the UHF range.

6. The detection plate according to claim 2, wherein a geometric circumference of the antenna loop is the same or a multiple of a half-wave of an operating wavelength of a reader device which remotely reads the detection plate.

7. The detection plate according to claim 6, wherein the antenna loop comprises multiple windings, and the antenna loop provides an antenna coil of an oscillating circuit tuned to the HF or LF range, and terminals of an HF or LF detection plate are galvanically connected to the ends of the wire.

8. The detection plate according to claim 7, wherein said wire comprises parallel windings that provide a single-winding antenna for the UHF range.

9. The detection plate according to claim 2, wherein the loop path of said wire is on a side of the rectangle opposite from the side containing said end regions of the wire.

10. The detection plate according to claim 1, wherein said second support is a flat textile structure, and said wire is an insulated wire mechanically connected to said flat textile structure.

11. The detection plate according to claim 10, wherein said insulated wire is mechanically connected to said flat textile structure by embroidery yarn.

* * * * *